April 19, 1960    J. B. HANDYSIDE    2,933,093
APPARATUS FOR CLEANSING LIQUID CONTAINING TANKS OR VESSELS
Filed Aug. 18, 1955    2 Sheets-Sheet 1
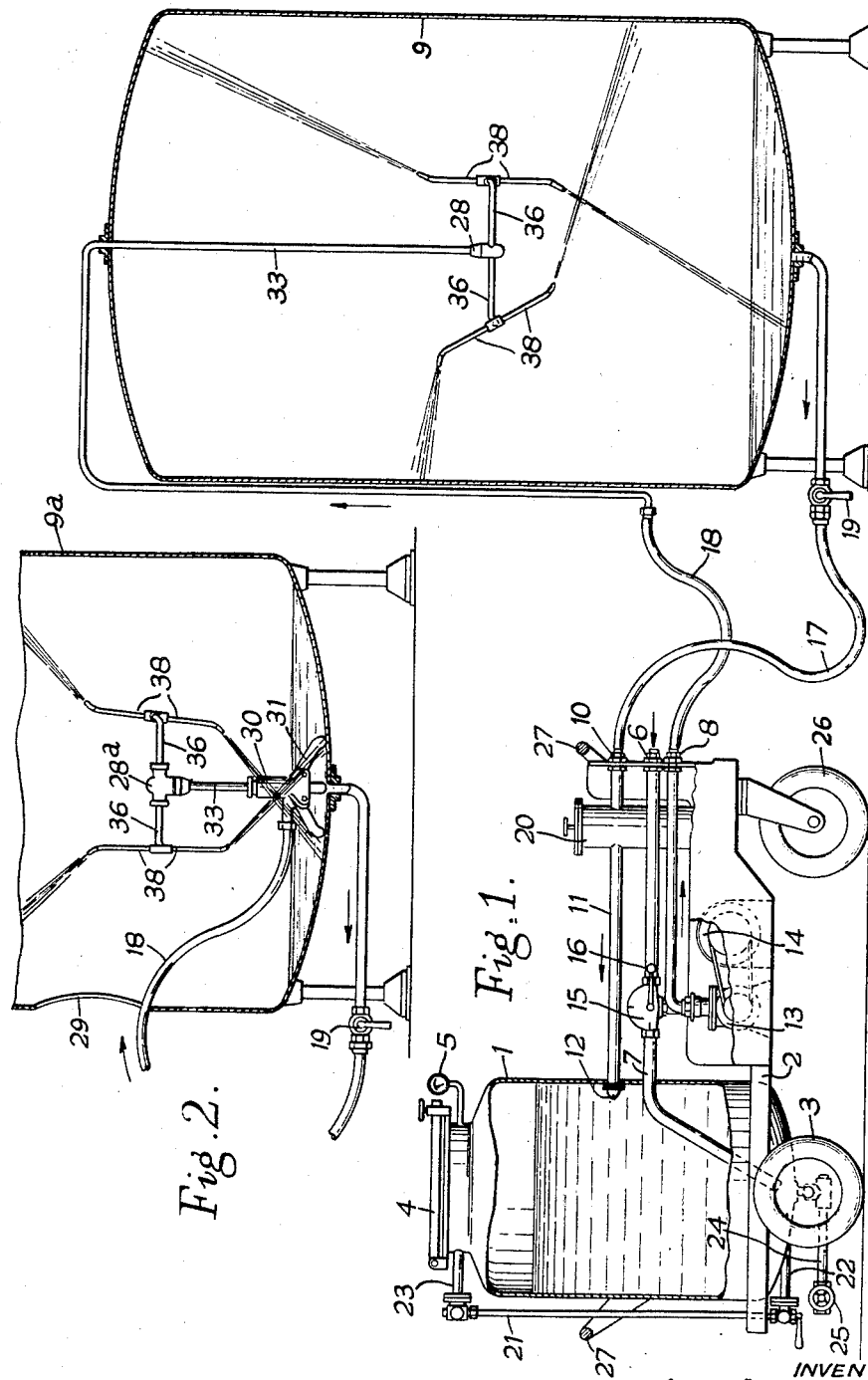
INVENTOR
James Baird Handyside
BY
Michael S. Striker
agt.

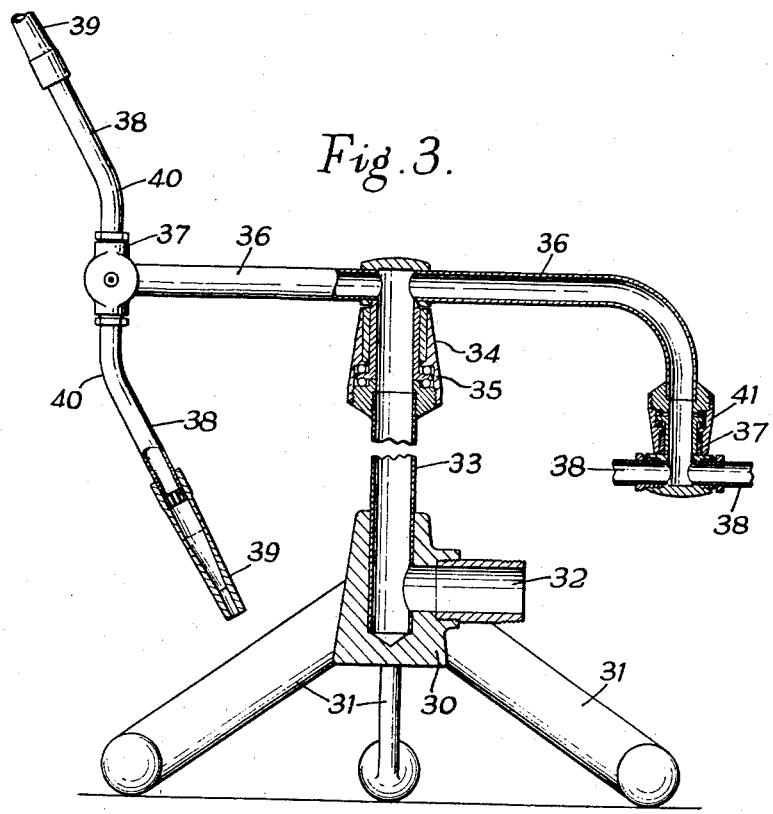
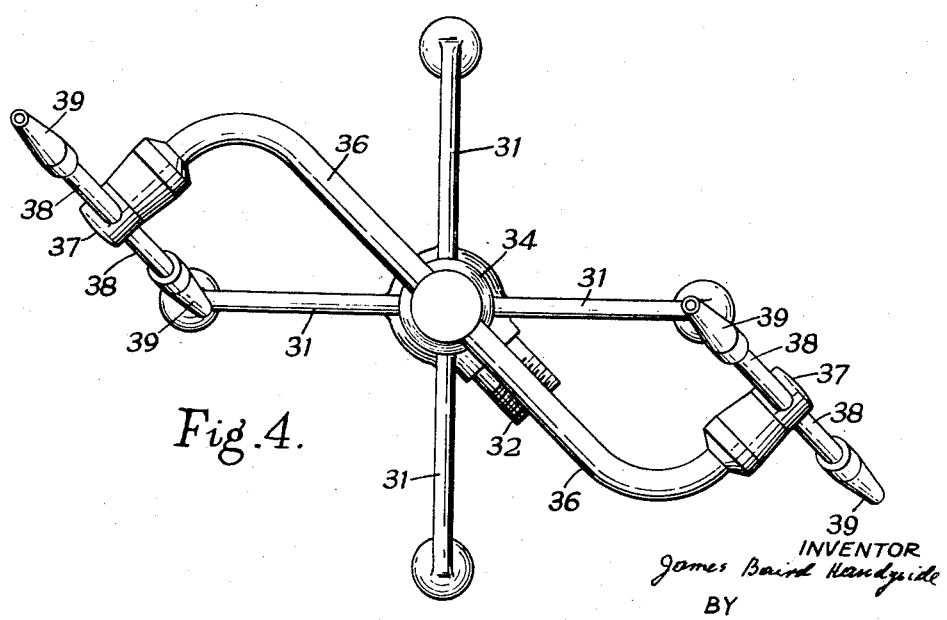

United States Patent Office 2,933,093
Patented Apr. 19, 1960

2,933,093

APPARATUS FOR CLEANSING LIQUID CONTAINING TANKS OR VESSELS

James B. Handyside, Horton, England, assignor to British Miller Hydro Company Limited, Slough, England Application August 18, 1955, Serial No. 529,193

Claims priority, application Great Britain August 18, 1954

1 Claim. (Cl. 134—168)

The apparatus forming the subject of the present application has been designed primarily for cleansing and/or sterilizing the stainless steel, aluminium and glass lined tanks and tankers in common use for storage, processing, and bulk delivery of the relative liquids in the brewing, beverage, milk, liquid food, petroleum and kindred industries.

The invention has, however, other applications where it is necessary to cleanse periodically other tanks or vessels, for example, in the cleaning and "de-gassing" of sea-borne oil tankers, or the cleaning, by flushing, of pipe systems, for example, beer mains.

Apparatus in accordance with the present invention consists broadly of a recirculating tank for containing a cleansing fluid from which tank the cleansing fluid is delivered to the tank or vessel which is to be cleansed and after being sprayed over the interior surface thereof is returned to the recirculating tank for further use.

The apparatus preferably includes a mobile or fixed rotary spraying unit which is placed in the vessel which is to be cleansed. The rotary spraying unit is connected via a high pressure pump to the air-tight recirculating tank hereinbefore referred to which contains the cleansing fluid. The operation of the pump causes the cleansing fluid to be sprayed uniformly over the interior surface of the vessel being cleaned. As air cannot enter the recirculating tank to replace the liquid drawn off by the pump the pressure inside the recirculating tank is lowered and this fall in pressure is used to cause the cleansing fluid, which has been sprayed into the vessel being cleaned to be returned to the recirculating tank for further use.

It is proposed to flush-out the vessel being cleaned with mains water before and after the application of the cleansing fluid and to accomplish this efficiently the same high pressure pump is used, a three-way cock being introduced on the suction side of the pump, its pipe connections going to:

(a) main water supply
(b) mobile rotary sprayer via pump
(c) recirculating tank

The recirculating tank also has a pipe connection to the bottom outlet of the vessel being cleaned. This pipe is only connected when cleansing fluid is being sprayed and it is along this pipe that the cleansing fluid returns to the recirculating tank. (The bottom outlet of the vessel being cleaned is left open when mains water is being sprayed.)

The three positions of the three-way cock therefore give the following connections:

Position one.—Mains water to recirculating tank.
Position two.—Mains water to rotary sprayer unit via pump.
Position three.—Recirculating tank to rotary sprayer unit via pump.

Referring to the drawings:

Figure 1 is a sectional view illustrating the recirculating tank in accordance with the invention associated with a tank or vessel which is being cleansed, the tank or vessel containing a fixed rotary sprayer unit:

Figure 2 is a fragmentary sectional view of a tank or vessel containing a mobile rotary sprayer unit in accordance with a modified embodiment of the invention:

Figures 3 and 4 are respectively a fragmentary sectional view and plan view of another modified embodiment of a mobile sprayer unit in accordance with the invention.

Referring in the first case of Figure 1 of the accompanying drawings, the recirculating tank is in the form of a mobile unit, the unit comprising a recirculating tank proper 1 mounted on a chassis or frame 2 fitted with road wheels 3, the recirculating tank 1 being fitted at its upper end with an air-tight manway 4 through which the tank can be filled with detergent, the tank being fitted near its upper end with a vacuum gauge 5.

A connection 6 is taken to the mains water supply through which mains water can be passed into the recirculating tank by way of the pipe connection 7, or alternatively, pass via a high pressure pump 14 by way of a connection 8 to the tank or vessel 9 which is to be cleansed. A third connection 10 is provided by which liquid accumulating at the bottom of the tank or vessel 9 can be returned to the recirculating tank by way of pipe 11 and non-return valve 12, the non-return valve 12 being situated below the level of the cleansing fluid contained in the recirculating tank 1.

The high pressure pump 13 is mounted on the chassis 2 the pump being driven by an electric motor 14, a three-way cock 15 being arranged on the suction side of the pump, the position of the cock being under the control of a handle 16.

The three-way cock 15 enables mains water to be supplied to the recirculating tank, mains water to be supplied under pressure to the tank or vessel 9, or to enable the cleansing fluid in the recirculating tank 1 to be supplied under pressure to the tank or vessel 9.

Flexible hose connections 17 and 18 are taken from connections 10 and 8 respectively to the tank or vessel 9, a valve 19 being provided between hose connection 17 and the tank or vessel 9 which valve can be opened to enable liquid accumulating in the bottom of the tank or vessel 9 to return to the recirculating tank. A strainer pot 20 is interposed in the pipe connections 17 and 11 through which the liquid returning to the recirculating tank must necessarily pass.

The recirculating tank 1 is fitted with a liquid level height gauge 21 having connections 22 and 23 with the lower and upper ends of the recirculating tank. A further connection 24 incorporating a valve 25 is taken to the bottom of the recirculating tank for drainage purposes.

The chassis or frame 2 in addition to the main road wheels 3 is fitted with a third castorable wheel 26 and with handles 27 at its opposite ends for hand propulsion.

In the case of Figure 1 the tank or vessel 9 is fitted with a fixed sprayer unit 28, but in the case of Figure 2 the sprayer unit 28a is of a mobile character, whereby it can be inserted in the tank or vessel 9a through a manhole or inspection opening 29.

The preferred form of sprayer unit is illustrated in Figures 3 and 4, the unit comprising a base 30 carried by legs 31 and having a connection 32 for the flexible hose 18, the base carrying a hollow vertical post 33 which supports a revolvable head 34, a ball or other type bearing 35 ensuring free rotational movement of the head as a result of reaction of the issuing jets of cleansing fluid. The head 34 is fitted with two diametrically opposite pipes 36 each terminating in a subsidiary head 37 fitted with a pair of diametrically opposite delivery pipes 38 carrying nozzles 39. Pipes 38 are bent as at 40, whereby each subsidiary head and its associated pipes 38 and nozzles 39 will revolve as a result of reaction of the issuing jets, suitable bearings 41 being associated with each head 37 to ensure free rotational movement. The pressure axes of the issuing jets is such as to cause rotational movement of the subsidiary heads and main head so that the whole of the interior surface of the tank or vessel 9 or 9a will be sprayed with cleansing fluid under high pressure.

In the case of Figures 3 and 4 legs 31 are fixed, but in the case of Figure 2 the legs are hingedly associated with the base 30 so that the legs can be folded to facilitate insertion of the sprayer unit into the tank or vessel.

Method of operation

To charge the recirculating tank 1 the operator moves the lever of the three-way cock to position one (mains water to recirculating tank) adding through the filler cap or manway 4 of the recirculating tank the requisite amount of cleansing fluid as the tank fills, thus ensuring good mixing. When the recirculating tank is filled to the required level as indicated by the height gauge 21 the manway 4 is closed, thus sealing the tank hermetically.

The operator then moves lever 16 of three-way cock to position two (mains water to rotary sprayer unit via pump) and the vessel 9 or 9a which is to be cleansed is flushed out with mains water until all solid matter has been removed to waste through the bottom outlet 19 which is for that purpose temporarily disconnected from pipe 17.

The operator then stops the pump and reconnects hose 17 with the vessel 9 leaving the valve 19 closed for the time being. The lever 16 of the three-way cock is then turned to position 3 (recirculating tank to rotary sprayer unit via pump) and starts the pump, thus spraying the inner surface of the vessel with cleansing fluid which cleansing fluid will flow down the walls of the vessel and accumulate at the bottom. When the bottom outlet opening of vessel 9 has been covered with cleansing fluid to a sufficient depth valve 19 is opened and due to the fact that the recirculating tank is hermetically sealed the fall in level of the cleansing fluid in the recirculating tank will result in a reduction in pressure in the recirculating tank, the cleansing fluid which has accumulated at the bottom of the vessel 9 then returning via hose connection 17 and pipe 11 to the recirculating tank 1, the cleansing fluid passing the non-return valve 12, the latter serving to prevent loss of cleansing fluid when the return pipe connection is disconnected from the bottom outlet of the vessel 9. When the cleansing fluid has been applied for the requisite period the pump is stopped and when as much cleansing fluid as will return to the recirculating tank has returned (as indicated on the tank's gauge glass 21), the return connection is disconnected.

The operator then moves lever 16 of the three-way cock back to position two (mains water to rotary sprayer unit via pump), starts pump and gives the vessel 9 being cleansed a final rinse to remove all traces of cleansing fluid.

It will be appreciated that as a result of the jet nozzles being given a set which by reaction will produce rotational movement of the jets and subsidiary arms in two substantially parallel vertical planes and at the same time produce rotational movement of the main arms in a horizontal plane about the axis of the vertically positioned post, the interior of the vessel 9 will be very efficiently sprayed with cleansing fluid.

The mobile sprayer unit shown in Figures 3 and 4, or the alternative form illustrated in Figure 2, is particularly suitable for use with a horizontal axis vessel, the length of which substantially exceeds its diameter, the rotary sprayer unit being movable by hand along the bottom of the vessel to ensure that the whole of the inner surface of the vessel receives adequate treatment. Where the vessel to be cleansed has its manway in the top portion (as for example in the case of road or rail tankers and the compartments of sea-borne oil tankers), the vertical tube or post of the sprayer unit may be connected direct to the hose delivering the flushing liquid in which case the sprayer unit will be hung by the hose through the manway. In the case of a vertical axis vessel, such as is shown in Figure 1, the sprayer unit will be lowered by hand so that the whole depth of the vessel is treated in stages and the whole inner surface receives adequate treatment. To assist in this operation the hose may be graduated so as to give a visual indication of the depth of the sprayer unit within the vessel. Alternatively, as previously stated, in the case of some vessels the sprayer unit may be fixed permanently inside the vessel in such a manner that all parts of the inner surface of the vessel are within effective range of the jets.

In some instances where it is desirable to use cleansing liquid at a high temperature, the recirculating tank may be provided with means for heating its contents which may take the form of a thermostatically controlled electric immersion heating element, or internal steam coils or merely provision for the injection of live steam.

Many modern sterilizing agents particularly of the quaternary ammonium group are capable of being used over and over again without undue loss of their killing properties. It will be appreciated that by the use of a recirculating tank for the cleansing fluid this is not lost after each cleansing operation, but is returned to the recirculating tank for subsequent use.

Furthermore the cleansing or sterilizing process is considerably speeded up as hitherto it has been necessary to leave the cleansing fluid in contact with the inner surface of the vessel being treated for a considerable time (varying from one hour to twenty-four hours according to the sterilizing agent used) in order to make certain that the thin film of cleansing fluid applied to the inner walls of the vessel being treated has had sufficient time to destroy all spoilage organisms. By using a recirculating tank and high pressure jetting the spoilage organisms are washed off the walls of the vessel being treated and return with the cleansing fluid to the recirculating tank and their destruction takes place actually in the recirculating tank where the bulk of cleansing fluid ensures their speedy neutralization.

This means that the vessel being cleaned is not out of commission as hitherto while the cleansing liquid did its work and before the vessel could be given its final mains water rinse. By using the recirculating tank the final mains water rinse can be applied directly after the cleansing fluid rinse, the vessel then being ready immediately for use.

The mobile rotary spraying unit and the recirculating tank will be constructed of materials which will be unaffected by any of the cleansing fluids in use today.

The sprayer unit will also be covered externally with rubber or polyvinyl chloride in order to minimize the risk of damage to vessels having glass or other fragile linings.

Where necessary several spraying units can be operated simultaneously from the one recirculating tank unit as, for example, when it is desired to cleanse a battery of beer tanks quickly or a multi-compartment road tanker.

I claim:

Apparatus for the purpose specified including a recirculating tank for containing a cleansing fluid and means for delivering said cleansing fluid from said recirculating tank to a vessel to be cleansed and distributing the cleaning fluid over the interior surface of said vessel in the forms of a spray and returning the cleansing fluid to the recirculating tank for further use, wherein the recirculating tank is hermetically sealed at its upper end, said returning means including a connection to the recirculating tank normally below the cleansing liquid level therein, said connection including a non-return valve, said connection leading to the bottom of the vessel to be cleansed, the arrangement being such that a sub-atmospheric pressure will be created in the recirculating tank as a result of a fall in level of the cleansing liquid to produce a return flow from the vessel being cleansed back to the recirculating tank.

References Cited in the file of this patent

UNITED STATES PATENTS

| | | |
|---|---|---|
| 1,799,105 | Lasko | Mar. 31, 1931 |
| 1,806,740 | Butterworth | May 26, 1931 |
| 2,208,813 | Ostling | July 23, 1940 |
| 2,306,926 | Allen | Dec. 29, 1942 |
| 2,471,506 | Wiswall | May 31, 1949 |
| 2,570,021 | Beach | Oct. 2, 1951 |
| 2,576,843 | Lockman | Nov. 27, 1951 |
| 2,603,227 | Paxton | July 15, 1952 |
| 2,653,116 | Whitcomb | Sept. 22, 1953 |
| 2,653,420 | Ruth | Sept. 29, 1953 |
| 2,714,080 | Kennedy | July 26, 1955 |